United States Patent
Park et al.

(10) Patent No.: US 9,499,753 B2
(45) Date of Patent: Nov. 22, 2016

(54) GASIFICATION PROCESS AND SYSTEM USING DRYER INTEGRATED WITH WATER-GAS SHIFT CATALYST

(71) Applicants: SK INNOVATION CO., LTD., Seoul (KR); SK ENERGY CO., LTD., Seoul (KR)

(72) Inventors: Jong Sung Park, Daejeon (KR); Ji Sung Park, Incheon (KR); Cheon Seong Lee, Busan (KR); Gyoo Tae Kim, Daejeon (KR); Jae Wook Shin, Seoul (KR); Yong Jeon Kim, Daejeon (KR)

(73) Assignees: SK INNOVATION CO., LTD., Seoul (KR); SK ENERGY CO., LTD., Seoul (KR)

( * ) Notice: Subject to any disclaimer, the term of this patent is extended or adjusted under 35 U.S.C. 154(b) by 15 days.

(21) Appl. No.: 14/650,997

(22) PCT Filed: Dec. 11, 2013

(86) PCT No.: PCT/KR2013/011456
§ 371 (c)(1),
(2) Date: Jun. 10, 2015

(87) PCT Pub. No.: WO2014/092447
PCT Pub. Date: Jun. 19, 2014

(65) Prior Publication Data
US 2015/0307791 A1    Oct. 29, 2015

(30) Foreign Application Priority Data

Dec. 11, 2012    (KR) .................. 10-2012-0143677

(51) Int. Cl.
*C01B 3/38*    (2006.01)
*C10J 3/06*    (2006.01)
(Continued)

(52) U.S. Cl.
CPC .. *C10J 3/06* (2013.01); *C01B 3/16* (2013.01); *C10J 3/12* (2013.01); *C10J 3/20* (2013.01); *C10K 3/04* (2013.01); *C01B 2203/0288* (2013.01); *C01B 2203/1023* (2013.01);
(Continued)

(58) Field of Classification Search
USPC ........................................ 252/373
See application file for complete search history.

(56) References Cited

U.S. PATENT DOCUMENTS 5,685,138 A    11/1997  Rao et al.
6,767,375 B1 *  7/2004  Pearson .................. C10J 3/485
                                                     48/111
(Continued)

FOREIGN PATENT DOCUMENTS

JP    2005-112927 A    4/2005
JP    2011214562 A    10/2011
(Continued)

OTHER PUBLICATIONS

Supplementary European Search Report for EP 13 86 2458 dated Jun. 16, 2016.
(Continued)

*Primary Examiner* — Melvin C Mayes
*Assistant Examiner* — Kenneth Vaden
(74) *Attorney, Agent, or Firm* — Abelman, Frayne & Schwab (57) ABSTRACT

The present invention relates to a gasification process and system, wherein a dryer integrated with a water-gas-shift catalyst is disposed in front of a gasifier.

17 Claims, 8 Drawing Sheets (51) Int. Cl.
*C01B 3/16* (2006.01)
*C10J 3/12* (2006.01)
*C10K 3/04* (2006.01)
*C10J 3/20* (2006.01)

(52) U.S. Cl.
CPC ............. *C01B2203/1047* (2013.01); *C01B 2203/1076* (2013.01); *C10J 2200/09* (2013.01); *C10J 2300/0909* (2013.01); *C10J 2300/0959* (2013.01); *C10J 2300/0969* (2013.01); *C10J 2300/1823* (2013.01); *Y02E 20/18* (2013.01)

(56) References Cited

U.S. PATENT DOCUMENTS

| | | | |
|---|---|---|---|
| 8,349,280 B2 | 1/2013 | Baek, II et al. | |
| 9,085,738 B2 * | 7/2015 | Frey | C10J 3/72 |
| 2009/0151250 A1 | 6/2009 | Agrawal | |
| 2011/0009501 A1 * | 1/2011 | Ernst | C01B 3/384 |
| | | | 518/704 |
| 2011/0314736 A1 | 12/2011 | Crespin | |
| 2012/0223274 A1 | 9/2012 | Hinton et al. | |
| 2012/0309856 A1 | 12/2012 | Eilos et al. | |

FOREIGN PATENT DOCUMENTS

| | | |
|---|---|---|
| KR | 10-2011-0037639 A | 4/2011 |
| KR | 10-2012-0056091 A | 6/2012 |
| WO | 2012151625 A1 | 11/2012 |

OTHER PUBLICATIONS

International Search Report for PCT/KR2013/011456 dated Mar. 10, 2014 (5 pages).

* cited by examiner

FIG. 1a

DRIED CARBONACEOUS FEEDSTOCK AND
GASIFICATION REACTION PRODUCT

FIG.1b

DRIED CARBONACEOUS FEEDSTOCK AND
GASIFICATION REACTION PRODUCT

FIG.2

DRIED CARBONACEOUS FEEDSTOCK
AND GASIFICATION REACTION PRODUCT

FIG. 3

DRIED CARBONACEOUS FEEDSTOCK
AND GASIFICATION REACTION PRODUCT

GASIFICATION PROCESS AND SYSTEM USING DRYER INTEGRATED WITH WATER-GAS SHIFT CATALYST

RELATED APPLICATION

This application is a §371 of PCT/KR2013/011456 filed Dec. 11, 2013, and claims priority from Korean Patent Application No. 10-2012-0143677 filed Dec. 11, 2012, both incorporated by reference in their entirety.

BACKGROUND OF THE INVENTION

1. Technical Field

The present invention relates to a gasification process and system using a dryer integrated with a water-gas-shift catalyst. More particularly, the present invention relates to a process and system for gasification, wherein a dryer integrated with a water-gas-shift catalyst is disposed in front of a gasifier at the time of using a water-containing carbonaceous feedstock to produce steam, so the steam produced from the dryer can be used to increase the production of hydrogen, and the production of synthesis gas to a feedstock can be maximized. This application claims the benefit of priority No. KR 2012-0143677 filed on Dec. 11, 2012.

2. Description of the Related Art

Generally, a gasification process is a series of processes for converting a carbonaceous feedstock such as coal, biomass or the like into synthesis gas containing hydrogen and carbon monoxide as major components using a gasification reaction under the supply of a gasifying agent (for example, oxygen, vapor, carbon dioxide or a mixture thereof). In this case, the term "synthesis gas" means artificially-made gas, not naturally-occurring gas, in a wide sense, and means a gas mixture including CO and $H_2$ in a narrow sense. Examples of typical reaction mechanisms of such a gasification process are represented by the following Reaction Formulae 1 to 3.

$C+\frac{1}{2}O_2 \rightarrow CO$ (partial oxidation)  [Reaction Formula 1]

$C+H_2O \rightarrow CO+H_2$ (steam reforming)  [Reaction Formula 2]

$C+CO_2 \rightarrow 2CO$ (carbon dioxide reforming)  [Reaction Formula 3]

Recently, a gasification process has been diversified into various kinds of technologies for producing various compounds, and application fields thereof have spread in order to produce various products including electric power. Specifically, it is known that a gasification process can be applied to power generation, ammonia preparation, oil refining and the like using hydrogen included in synthesis gas which is a main product of a gasification process; that it can be used to produce diesel oil, jet oil, lubricant base oil, naphtha and the like using synthesis gas as a feedstock of Fischer-Tropsch reaction represented by the following Reaction Formula 4; and that it can be to used to produce high value-added chemical materials such as acetic acid, olefin, dimethyl ether, aldehyde, fuel, additives and the like using methanol prepared from synthesis gas as represented by the following Reaction Formula 5. In relation to this gasification process, in the case of Fischer-Tropsch process and methanol synthesis process, it is preferred that the ratio of carbon monoxide to hydrogen be about 1:2.

$nCO+2nH_2 \rightarrow C_nH_{2n}+nH_2O$  [Reaction Formula 4]

$CO+2H_2 \rightarrow CH_3OH$  [Reaction Formula 5]

However, in the case of synthesis gas obtained by the steam reforming reaction represented by Reaction Formula 2 above and the carbon dioxide reforming reaction represented by Reaction Formula 3 above, the ratio of carbon monoxide to hydrogen does not reach 1:2. Therefore, generally, the ratio of carbon monoxide to hydrogen may be adjusted to about 1:2 by performing the water-gas-shift reaction of a reaction product obtained after a steam reforming reaction, a partial oxidation reaction and/or a carbon monoxide reforming reaction or by additionally supplying hydrogen to the reaction product $CO+H_2O \rightarrow CO_2+H_2$  [Reaction Formula 6]

Meanwhile, since coal, which a typical feedstock in a gasification process, is distributed in large quantities over a wide area throughout the world, it is attracting considerable attention again as a fuel source that can replace generally-used petroleum at the present time. Further, since biomass, which has recently attracted attention, can also be converted into a basic fraction of various kinds of fuels and platform compounds by various treatment processes, there is known a technology of applying biomass to a feedstock in a gasification reaction.

However, the above-mentioned feedstock in a gasification process contains a large amount of water. For example, coals are classified into high-grade coal and low-grade coal depending on the properties thereof, such as heating value, water content, impurities, etc. Here, it is known that the amount of low-grade coal (brown coal, etc.) reserves occupies about 45% of the total amount of coal reserves throughout the world. Particularly, when the content of water in coal is high, the coal becomes poor in terms of storability, treatability, freight and the like, so a large amount of energy is consumed to remove water from the coal prior to a gasification reaction.

In relation to this, U.S. Pat. Nos. 5,695,532 and 5,685,138 disclose technologies for using the heat of synthesis gas to dry a water-containing carbonaceous feedstock by disposing a dryer in front of a gasification reactor and recycling the high-temperature synthesis gas generated from the gasification reactor into the dryer.

However, the above-mentioned technologies do not realize advantages other than the effect of the thermal energy in high-temperature synthesis gas being used to dry a water-containing carbonaceous feedstock. Therefore, it is required to develop a gasification process that can realize additional advantages.

SUMMARY OF THE INVENTION

Accordingly, the present invention has been devised to solve the above-mentioned problems, and an object of the present invention is to overcome the conventional problem of utilizing the thermal energy of a product produced by a gasification reaction only to dry a feedstock in a drier disposed in front of a gasification reactor by recycling the product, thereby providing additional advantages.

In order to accomplish the above object, a first aspect of the present invention provides a gasification method, including the steps of a) supplying a water-containing carbonaceous feedstock into a dryer integrated with a water-gas-shift reaction catalyst b) drying the water-containing carbonaceous feedstock in the dryer while performing a water-gas-shill reaction using the steam as a reactant; c) solid-gas-separating the dried carbonaceous feedstock and the water-gas-shift reaction product; d) gasifying the dried carbonaceous feedstock in the presence of a gasifying agent to obtain a gasification product; and e) recycling a part of the gasification product to into the dryer in the step b) to provide an energy source for drying the water-containing carbonaceous feedstock.

A second aspect of the present invention provides a gasification system, including: a gasifier including a gasifying agent inlet and a dried carbonaceous feedstock inlet; a dryer which is integrated with a water-gas-shift reaction catalyst and which discharges a carbonaceous feedstock dried by a part of a gasification product recycled from the gasifier and a water-gas-shift reaction product and a solid-gas separator which separates the dried carbonaceous feedstock and water-gas-shift reaction product discharged from the dryer and which is connected with the dried carbonaceous feedstock inlet of the gasifier.

BRIEF DESCRIPTION OF THE DRAWINGS

The above and other objects, features and advantages of the present invention will be more clearly understood from the following detailed description taken in conjunction with the accompanying drawings, in which.

REFERENCE NUMERALS 10, 20, 30: WGS reaction region in dryer
11, 21: cylindrical inner wall
12, 22, 33: WGS catalyst
12a: low-temperature-range WGS catalyst
12b: high-temperature-range WGS catalyst
13: space between WGS catalysts
30: enclosure
31: inner space of enclosure
32: tube
100: dryer
101: lower portion of dryer
102: upper portion of dryer
200: separator
300: gasifier
301: oxidation region
302: gasification region

DESCRIPTION OF THE PREFERRED EMBODIMENTS

Hereinafter, preferred embodiments of the present invention will be described in detail with reference to the attached drawings.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Carbonaceous Feedstock

According to an embodiment of the present invention, it is understood that the "carbonaceous feedstock" includes solid, liquid and gaseous carbonaceous materials that can be used to produce synthesis in a wide sense. Examples of the carbonaceous materials may include, but are not limited to, biomass (plant matter such as herbaceous plant matter, woody plant matter, etc. and animal matter), coal (hard coal, soft coal (bituminous coal, brown coal, peat, etc.), low-grade active carbon and the like), organic waste, shale oil, coke, tar, and the like. These carbonaceous materials may be used independently or in a combination thereof. The content of carbon in the carbonaceous feedstock may be 20 wt % or more, specifically 30 to 80 wt % , and more specifically 40 to 70 wt %.

Preferably, when a water-containing carbonaceous feedstock or carbonaceous feedstock slurry is used, it will be suitable for realizing the advantages of the present invention. More preferably, a water-containing coal may be used. In this case, the content of water in the water-containing coal may be 20 to 70 wt %, specifically 20 to 50 wt %, and more specifically 20 to 40 wt %. In the case where the carbonaceous feedstock is used in the form of slurry, the content of solid in slurry may be 30 to 80 wt %.

Further, the carbonaceous feedstock (particularly, coal) may be pulverized to a particle size of 50 to 6000 μm, specifically 50 to 1000 μm, and more specifically 100 to 500 μm, and may be then introduced into a dryer.

Dryer

According to an embodiment of the present invention, a dryer (drying region) integrated with a water-gas-shift (WGS) catalyst (WGS catalyst layer or WGS catalyst sieve) is disposed in front of a gasifier. The form of the dryer is not particularly limited as long as the dryer can be integrated with a WGS catalyst. If necessary, in order for the dryer to be integrated with a WGS catalyst, the design of the inner portion of a specific type dryer may be changed. In relation to this, examples of the dryer may include a pneumatic or flash dryer, a fluidized-bed dryer, a rotary dryer, a rotary tube dryer and the like. However, in order to effectively remove water, it is advantageous that a pneumatic or flash drier, which can rapidly remove coal because water is easily diffused, is used as the dryer.

In this embodiment, the reasons for integrating a dryer with a WGS catalyst are that equipment investment cost can be lowered because a conventional WGS process disposed behind a gasifier in order to adjust the molar ratio of $H_2/CO$ in synthesis gas can be omitted or a process size can be reduced, that water included in a feedstock can be used in a WGS reaction without additionally supplying steam and that when carbon dioxide ($CO_2$), as a gasifying agent used in the following gasification reaction, is supplied to one or more gasification regions (dilute oxygen regions) as well as a combustion region, a C—$CO_2$ reaction can be maximized, and, as a result, the usage of a feedstock can be reduced.

Meanwhile, according to an embodiment of the present invention, it is advantageous that the WGS catalyst is designed such that it comes into contact with a gasification product (that is, it is heat-exchanged with a gasification product) recycled to a dryer to generate steam, and the steam is used as a reactant for a water-gas-shift reaction to the highest degree. For example, in the case where a recycled gasification product inlet and a water-containing carbonaceous feedstock inlet are provided at the lower portion of the dryer, when the WGS catalyst is disposed at the portion opposite to the lower portion thereof; that is, at the upper portion thereof, a large amount of steam produced by drying the feedstock can be effectively converted. Conversely, in the case where the recycled gasification product inlet and the water-containing carbonaceous feedstock inlet are provided at the upper portion of the dryer, the WGS catalyst may be disposed at the lower portion of the dryer.

Meanwhile, in this embodiment, the WGS catalyst may be integrally provided in the dryer in various shapes and methods.

Figure 1A:
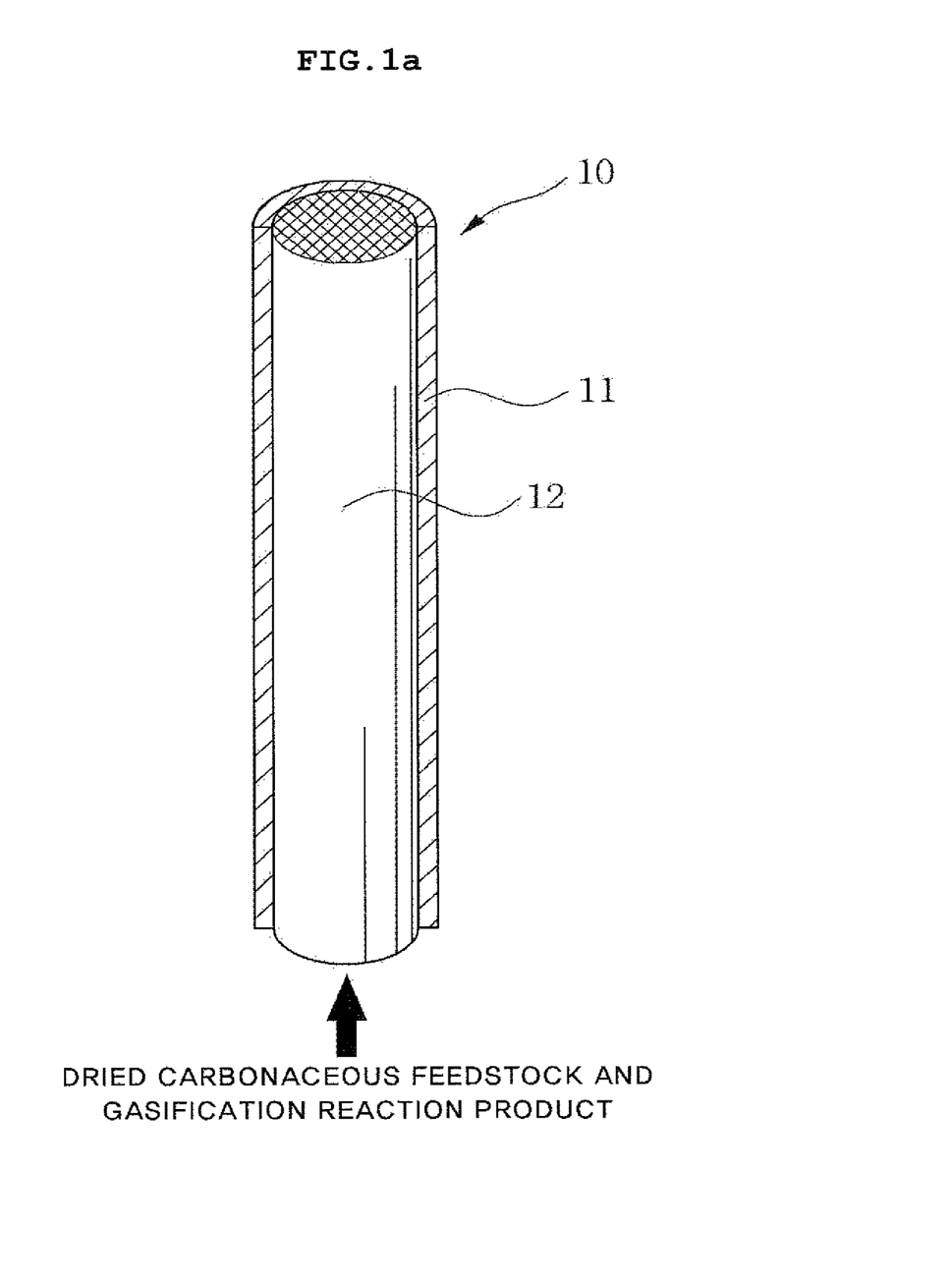
FIG. 1 is a view showing an illustrative constitution according to an embodiment of the present invention, wherein a water-gas-shift catalyst supported (applied) on a monolith structure is disposed in a WGS reaction region of a dryer.
Figure 1B:
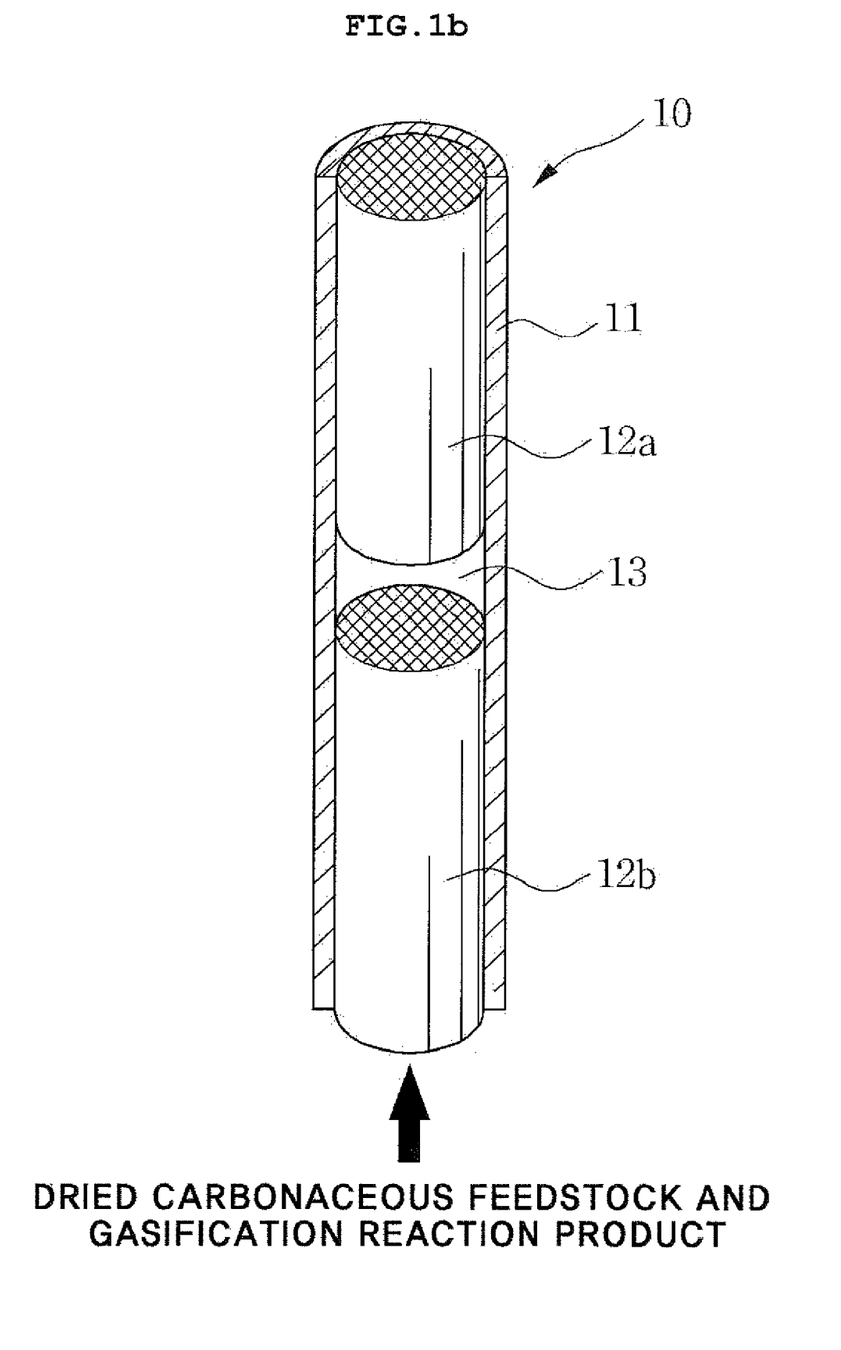

Each of FIGS. 1A and 1B shows an illustrative constitution in which a WGS catalyst is disposed in a WGS reaction region of a dryer.

As shown in FIG. 1A, a WGS reaction region 10 has a cylindrical shape, and a monolith structure 12 coated or supported with a WGS catalyst is inserted (interposed) in the space defined by the inner wall 11 of the WGS reaction region 10.

In the present specification, the "monolith structure" means a molded body including a plurality of linear or curved inner passageways for passing gas and solid particles (feedstock particles).

Specifically, since a plurality of inner passageways are extended from the inlet end of a monolith structure to the outlet end thereof, it is advantageous that these inner passageways are designed such that the contact area of a catalyst to steam and a gasification product (CO) is as large as possible. Particularly, in this embodiment, the inner passageways of the monolith structure must have suitable size and shape for passing dried feedstock particles (particularly, coal particles) and a gaseous gasification product. The monolith structure may be made of ceria, zirconia, titania, silica or the like, and may be formed by extruding a batch mixture into a monolithic molded body and then drying and calcining the monolithic molded body.

For example, when a carbonaceous feedstock (particularly, coal) having a particle size of 300 to 500 μm is used, the size (diameter) of the inner passageway of the monolithic structure is 0.5 cm or more, and specifically 0.5 to 5 cm in a flow direction. In this case, it is preferred that the gasification product discharged from a gasifier and recycled into a dryer is pressurized to sufficient pressure for lifting up dried feedstock particles.

Meanwhile, the WGS catalyst is applied or supported on the surface of inner passageways of the monolith structure. This coating or supporting method is commonly known in the related field. Examples of this coating or supporting method may include dipping, impregnation, spraying, evaporation, spin coating, sputtering and the like.

The WGS catalysts are classified into WGS catalysts suitable for a high temperature range (350~450° C.) and WGS catalysts suitable for a low temperature range (190~250° C.). Here, a $Fe_2O_3/Cr_2O_3$-based catalyst may be used as the WGS catalyst at a high temperature range, and a CuO/ZnO-based catalyst may be used as the WGS catalyst at a low temperature range. In addition, various WGS catalysts commonly known in the related field may be used. For example, platinum group metal catalysts (Pt, Pd, Rh, Ru, Ir, etc.) supported with rare-earth oxides (for example, Re) may be used, or composite catalysts (having improved sulfur resistance) obtained by impregnating the above WGS catalysts suitable for high temperature and low temperature ranges with rare-earth elements or platinum group metals may be used.

Meanwhile, as shown in FIG. 1B, the WGS catalyst applied or supported on the monolith structure may be divided into two WGS catalyst regions. Specifically, the WGS catalyst is configured such that a high-temperature-range WGS catalyst region and a low-temperature-range WGS catalyst region are sequentially disposed in a gas flow direction. In this embodiment shown in FIG. 1B, the low-temperature-range WGS catalyst 12a is disposed at the upper portion of the WGS reaction region 10, and the high-temperature-range WGS catalyst 12b is disposed at the lower portion thereof. In this case, a space 13 may be formed between the low-temperature-range WGS catalyst 12a and the high-temperature-range WGS catalyst 12b, or the bottom surface of the low-temperature-range WGS catalyst 12a and the upper surface of the high-temperature-range WGS catalyst 12b may be in contact with each other as long as the continuity of inner passageways can be maintained.

Figure 2:
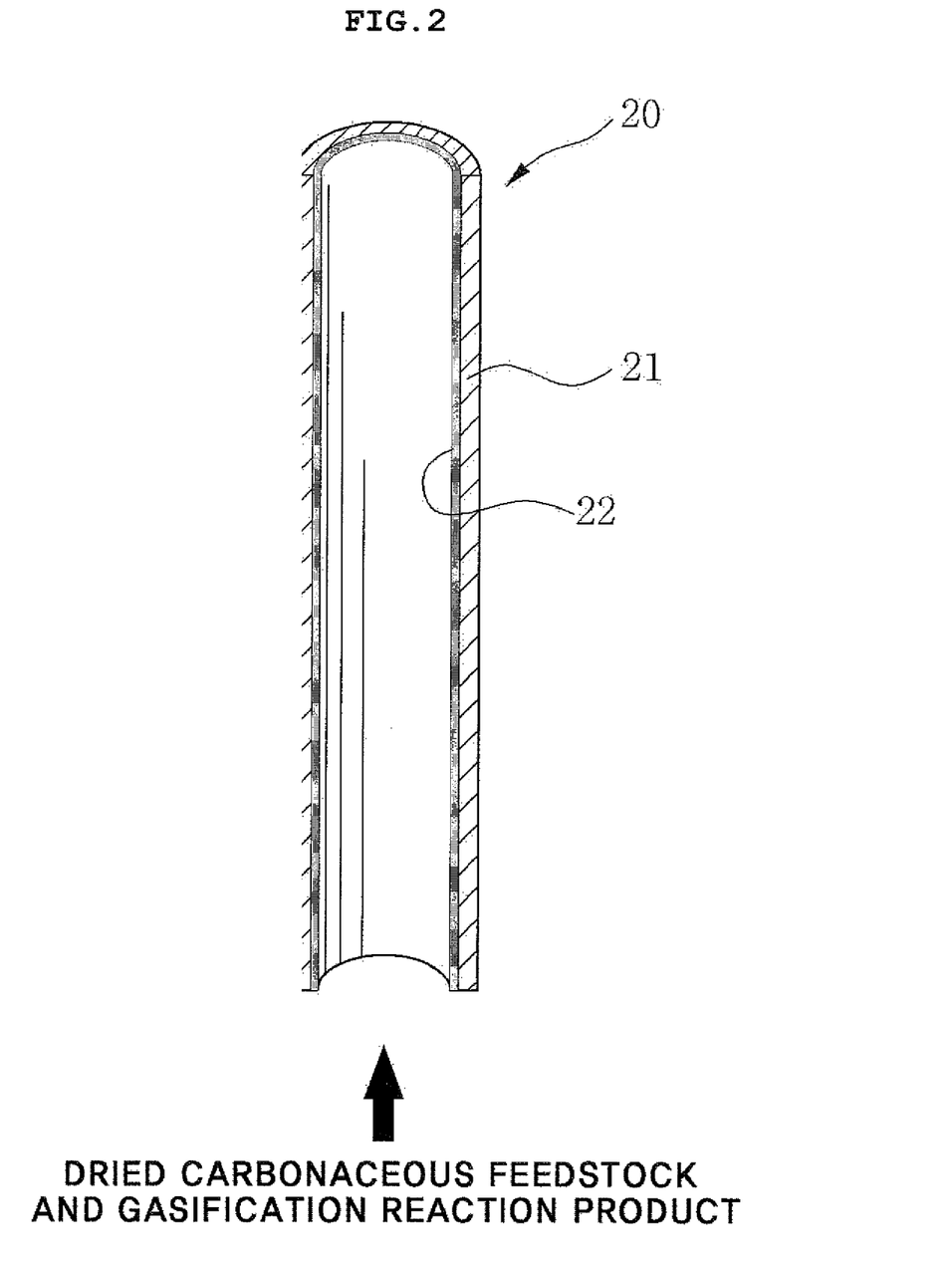
FIG. 2 is a view showing an illustrative constitution according to another embodiment of the present invention, wherein the inner wall of a WGS reaction region of a cylindrical dryer is coated with a water-gas-shift catalyst.

FIG. 2 shows an illustrative constitution according to another embodiment of the present invention, wherein the inner wall of a WGS reaction region of a cylindrical dryer is coated with a water-gas-shift (WGS) catalyst.

As shown in FIG. 2, the inner wall 21 of a WGS reaction region 20 is coated with a WGS catalyst 22. In this case, the thickness of the WGS catalyst may be 0.01 to 2 mm, and specifically 0.02 to 0.2 mm. Comparing this embodiment with the above-mentioned embodiment, since the area of the WGS catalyst is relatively small, WGS reaction efficiency is low, whereas the problems of the pressure drop due to the use of a monolith structure, the deterioration of mobility of solid dried coal particles, and the like can be considerably overcome. Further, the inner wall 21 of the WGS reaction region 20 may also be separately coated with the above-mentioned high-temperature-range WGS catalyst and low-temperature-range WGS catalyst, respectively.

Figure 3:
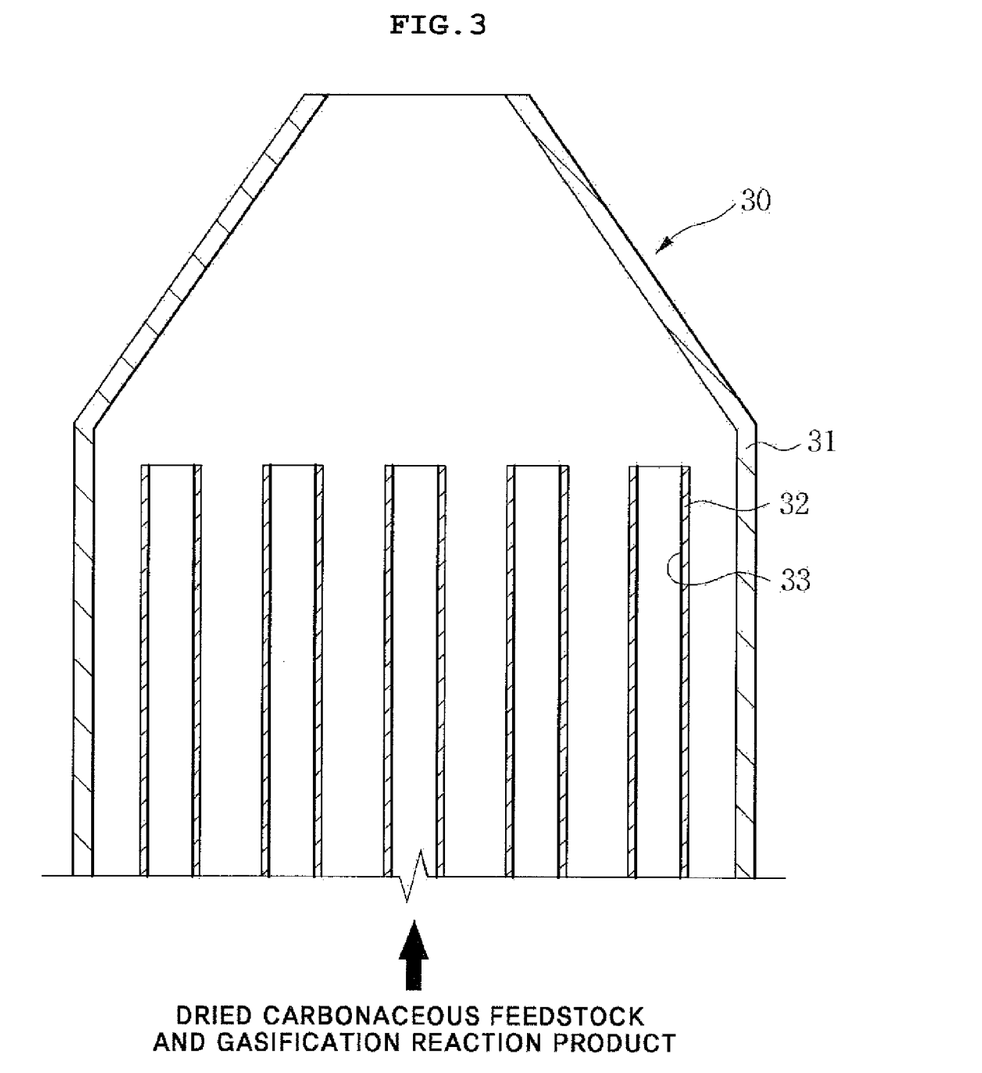
FIG. 3 is a view showing an illustrative constitution according to another embodiment of the present invention, wherein each of the inner walls of a plurality of tubes disposed in a WGS reaction region of a dryer is coated with a water-gas-shift catalyst.

FIG. 3 shows an illustrative constitution according to another embodiment of the present invention, wherein each of the inner walls of a plurality of tubes disposed in a WGS reaction region of a dryer is coated with a water-gas-shift (WGS) catalyst.

As shown in FIG. 3, a WGS reaction region 30 of a dryer is configured such that a plurality of tubes 32 are arranged in the inner space 31 of an enclosure 30 in parallel to each other. Further, the inner wall of each of the tubes 32 is coated with a WGC catalyst 33. Here, each of the tubes 32 may have a diameter of 0.5 to 5 cm, and may be made of inconel alloy, stainless steel or the like. Further, the thickness of the WGC catalyst 33 applied on the inner wall of each of the tubes 32 may be 0.01 to 2 mm, and specifically 0.02 to 0.2 mm.

According to this embodiment shown in FIG. 3, the problem of deterioration in flow of fluid (gas and solid) caused by the use of a monolith structure can be overcome, and an optimum level of contact area can be secured.

Meanwhile, the operating pressure in a dryer may be adjusted depending on the operating pressure of a gasifier discharging a gasification product recycled into the dryer. For example, the operating pressure in the dryer may be a maximum of 60 kg/cm$^2$. However, since the gasification product is generally discharged from the gasifier at a pressure of 5 to 40 kg/cm$^2$ and then recycled into the dryer, considering the pressure drop phenomenon caused by this recycling procedure, the pressure in the dryer may be 4 to 35 kg/cm$^2$. If necessary, the pressure in the dryer may be additionally increased by mounting a pressurization device in the dryer.

The operating temperature in a dryer may depend on the temperature of a gasification product discharged from a gasifier. For example, the operating temperature at the inlet of the dryer may be in a range of 300 to 1200° C., and specifically 400 to 1000° C., and the operating temperature at the outlet of the dryer may be in a range of 100 to 500° C., and specifically 150 to 300□. The dried carbonaceous feedstock may have a water content of 10 wt % or less, specifically 1 to 8 wt %, and specifically 1 to 5 wt %.

According to the above-mentioned drying method, a large amount of steam generated during a drying procedure is mixed with synthesis gas by a WGS reaction, not a simple physical mixing method. Thanks to the WGC reaction, hydrogen, which is produced in a small amount by a general gasifier, can be produced (when steam, as a gasifying agent, is not supplied to the gasifier, the production of hydrogen becomes smaller). In addition, the residence time of gas in the dryer may be 2 to 10 seconds, specifically 2 to 5 seconds, and more specifically 2 to 3 seconds. The above-mentioned process conditions in the dryer can be illustratively understood, and can be changed depending on the size, type and the like of the dryer.

Gasifier

According to an embodiment of the present invention, as a gasifier, various types of reactors known in the related field may be used. The gasifier is provided with an inlet for introducing a gasifying agent and an inlet for introducing a dried carbonaceous feedstock discharged from a dryer disposed in front of the gasifier. Examples of the gasifier may include a moving-bed gasifier (dried carbonaceous feedstock is introduced into the upper portion thereof, and a gasifying agent comes into contact with the feedstock in a counterflow manner in the lower portion thereof), a fluidized-bed gasifier (a gasifying agent floats solid particles while passing through a carbonaceous feedstock bed), a transport reactor gasifier, a distributary flow gasifier (a carboneous feedstock and a gasifying agent are introduced in parallel), and the like. As will be described later, among these gasifiers, a transport reactor gasifier may be advantageous because it can provide various carbon dioxide supply ports.

According to an embodiment of the present invention, the operating temperature in the gasifier may be 700 to 1500° C., specifically 800 to 1500° C., and more specifically 1000 to 1500° C. Further, the operating pressure in the gasifier may be 5 to 60 kg/cm$^2$, specifically 5 to 40 kg/cm$^2$, and more specifically 20 to 40 kg/cm$^2$. Further, the molar ratio of $O_2/C$ in the gasifier may be 0.5 or less, specifically 0.1 to 0.5, and more specifically 0.2 to 0.4.

However, in this embodiment, the molar ratio of steam/C in the gasifier may be substantially adjusted to 0. The reason of this is that hydrogen can be obtained by the WGS reaction in the dryer. In this case, in the gasifier, the production of carbon monoxide in synthesis gas can be increased by a partial oxidation reaction (Reaction Formula 1 above) and/or a carbon dioxide reforming reaction (Reaction Formula 3). However, if necessary, steam may be supplied into the gasifier for the purpose of temperature control. In this case, the ratio of steam/carbon by mole may be a maximum of 1.

Meanwhile, in this embodiment, a gasification reaction may be performed by supplying carbon dioxide, oxygen or a mixture thereof as a gasifying agent. Therefore, the molar ratio of $CO_2/C$ may be 0 to 2, and specifically 0.1 to 1.

According to an embodiment of the present invention, in the gasification reaction, the conversion ratio of hydrocarbon may be 90% or more, and specifically 96 to 99%. Further, the conversion ratio of carbon dioxide (when a carbon dioxide-containing gasifying agent is supplied) may be 10 to 100%, specifically 30 to 90%, and more specifically 50 to 80%.

Figure 4:
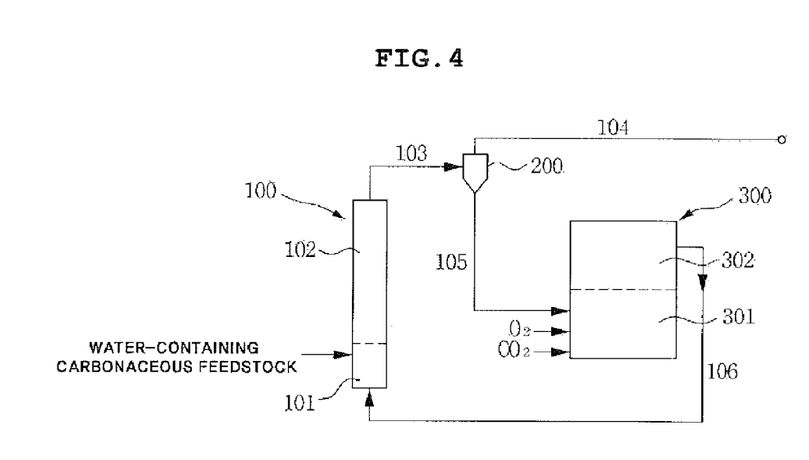
FIG. 4 is a schematic view showing a gasification process according to an embodiment of the present invention, wherein a dryer integrated with a water-gas-shift reaction catalyst layer is disposed in front of a gasifier.
Figure 5A:
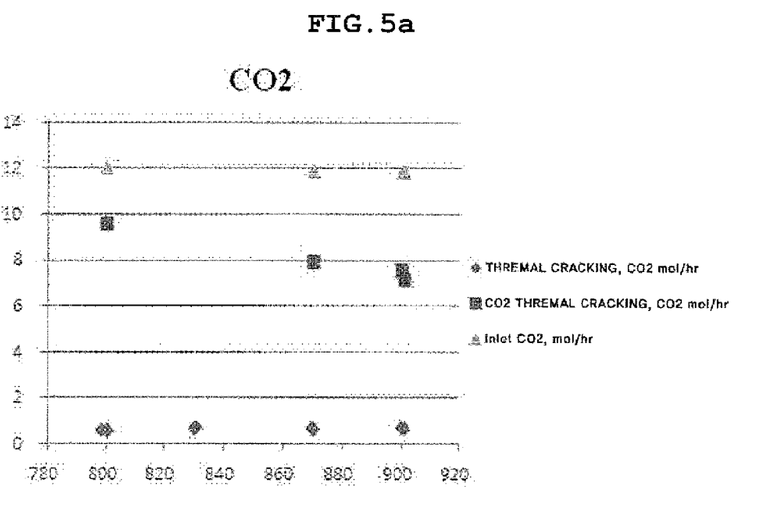
FIGS. 5A to 5D are graphs each showing the change of the composition of a gasification product to temperature depending on a carbon dioxide reforming reaction and a thermal cracking reaction according to an embodiment of the present invention.
Figure 5B:
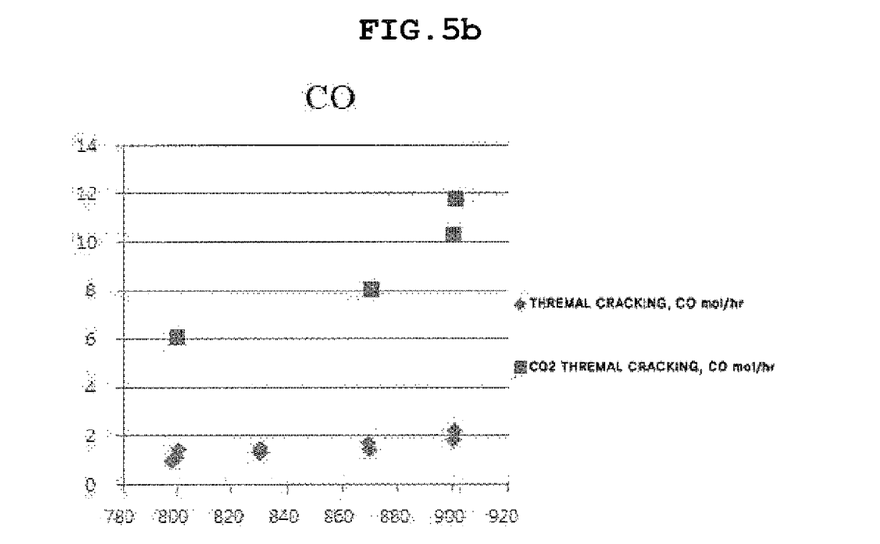
Figure 5C:
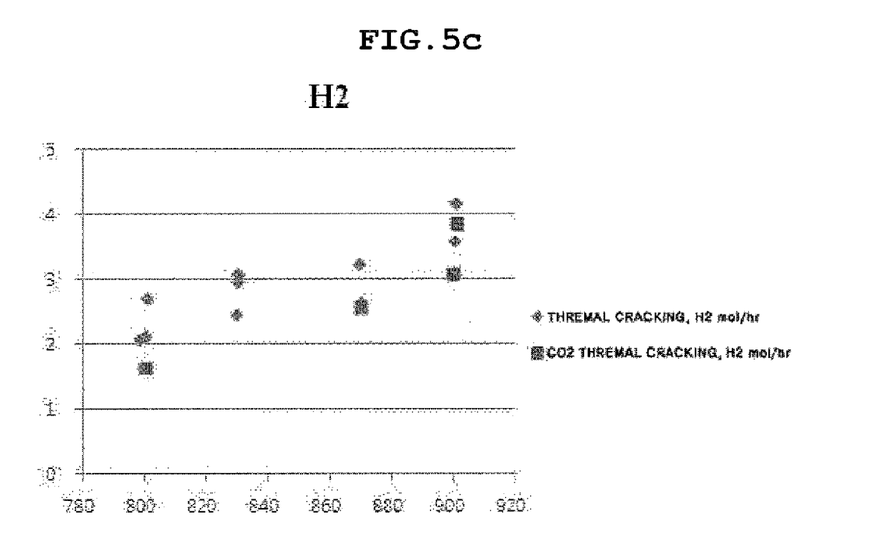
Figure 5D:
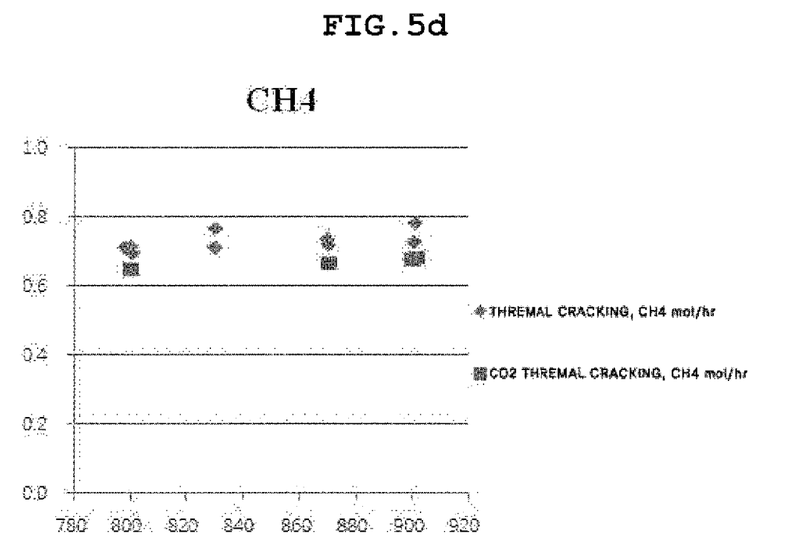

FIG. 4 shows a gasification process according to an embodiment of the present invention, wherein a dryer integrated with a water-gas-shift reaction catalyst layer is disposed in front of a gasifier.

In FIG. 4, the gasification process largely include a dryer 100 integrated with a WGS catalyst, a separator 200 and a gasifier 300. The constituents in the gasification process may be connected with each other by a commonly-used connecting means, for example, a pipe, and a carbonaceous feedstock and a gasification product may be transferred therebetween through the connecting means.

In this embodiment, a water-containing carbonaceous feedstock (particularly, coal) is introduced into the lower portion 101 (drying region) of the drier 100, and a gasification product recycled from the gasifier 300 is introduced into the lower end of the drier 100. In this case, the water content of each of the gaseous product discharged from the dryer 100 (gaseous product discharged after a WGS reaction) and the dried carbonaceous feedstock is determined depending on the temperature and pressure of a gasification product introduced into the drier 100, the initial water content and particle size of a carbonaceous feedstock and the mixing ratio of synthesis gas and carbon fuel introduced into the drier 100. Here, the weight ratio of the gasification product and carbonaceous feedstock introduced into the drier 100 may be 1:1 to 1:30, and specifically 1:2 to 1:5.

A mixture of steam produced by drying a carbonaceous feedstock and a gasification product comes into contact with a WGS catalyst (not shown) disposed at the upper portion 102 of the dryer 100, and the content of hydrogen and carbon dioxide is increased by a WGS reaction. As a result, the gaseous mixture discharged from the dryer (gaseous product produced after a WGS reaction) includes $H_2$, CO, $CO_2$ and $H_2O$, and, in this case, the molar ratio of $H_2/CO$ may be 1 to 3.

In this embodiment, the dried carbonaceous feedstock and the gaseous mixture are transferred from the top of the dryer 100 to a separator 200 through a line 103. Here, the separator 200 serves to separate a gaseous component and a solid component (dried carbonaceous feedstock). As the separator 200, a solid-gas separator commonly known in the related field, for example, a cyclone may be used. In this case, since the separated gaseous component 104 may include dust, sulfur compounds, nitrogen compounds and the like, it may additionally pass through a post-treatment process (not shown) provided with a filter (ceramic filter), an electric dust collector, a scrubber, a desulfurizer or the like.

Further, the gaseous component 104 obtained in this way may be supplied to a subsequent process such as an integrated gasification combined cycle (IGCC) process, an F-T to process or the like.

Meanwhile, the dried feedstock 105 separated by the separator 200 is supplied into the gasifier 300 through an inlet (not shown) mounted at the lower portion of the gasifier 300, and a gasifying agent (for example, oxygen and carbon dioxide) is introduced into the gasifier 300 through a gasifying agent inlet (not shown). In this case, considering the pressure in the gasifier 300, dried carbon may be selectively introduced into the gasifier 300 using a feed supply means, specifically, a lock hopper (for example, Lurgi, Macawber controlveyor), a rotary feeder (for example, asthma feeder), a plug-forming feeder (for example, plug screw feeder), a non-plug-forming feeder (for example, piston feeder) or the like. In this case, the pressure of the feed supply means may be equal to or higher than the pressure in the gasifier 300. Specifically, the pressure of the feed supply means may be 5 to 65 kg/cm$^2$.

After the gasification reaction is completed, a gasification product is recovered, and is then recycled into the dryer 100 along the line 106. According to an embodiment of the present invention, while the entire gasification product is recycled into the drier 100, the size or drying capacity of the dryer 100 may be determined depending on the amount of the recycled gasification product. However, selectively, while a part of the gasification product is recovered as synthesis gas and then transferred to a subsequent process, the residual gasification product may be recycled into the dryer 100. In this embodiment, since steam is not used as a gasifying agent, the content of CO in the gasification product is high compared to that in synthesis gas discharged from a general gasifier. The hydrogen and steam included in the gasification product are derived from the water and hydrogen remaining in the dried feedstock and the steam selectively supplied into the gasifier 300 for the purpose of temperature control.

The content ratio of carbon monoxide in the gasification product discharged from the gasifier 300 may be 10 to 80% by mol. Further, synthesis gas discharged from the gasifier 300 may be used to control the temperature of recycle gas introduced into the dryer 100 via a heat exchanger (not shown).

Meanwhile, when oxygen and carbon dioxide are introduced into a gasifier as a gasifying agent, the lower region of the gasifier is a combustion region (oxidation region) to provide energy necessary for a gasification reaction, and the upper region thereof is a gasification region (dilute oxygen region). In this case, carbon monoxide is generally produced in the gasification region. That is, generally, in the combustion region, a carbonaceous feedstock first reacts with oxygen to be perfectly or partially oxidized (combusted), so the degree of a carbon dioxide reforming reaction is relatively low.

The arrangement of the combustion region and gasification region may be changed depending on the type of a reactor. For example, when a transport reactor gasifier is used as the gasifier, a lower portion of a riser constitutes a combustion region, an upper portion of a riser constitutes a gasification region (dilute oxygen region), and a loop seal, a standpipe and a J-leg correspond to a dilute oxygen region.

Figure 6:
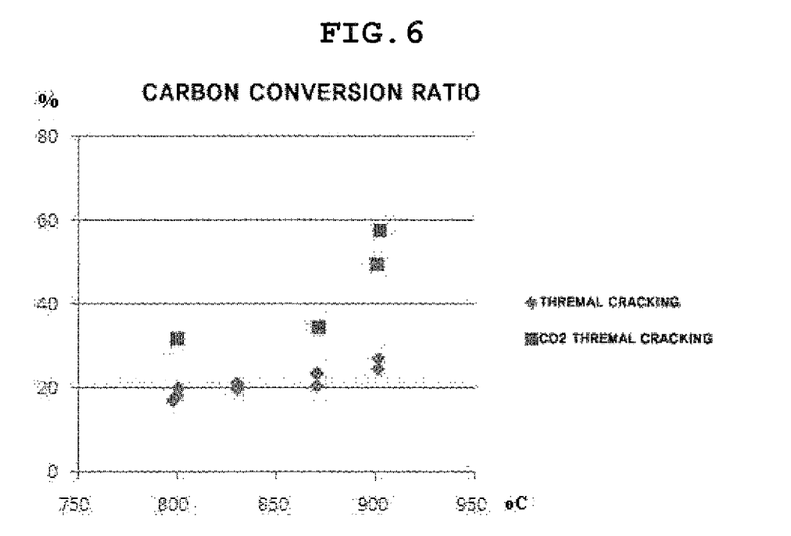
FIG. 6 is a graph showing the change of the conversion ratio of carbon to temperature depending on a carbon dioxide reforming reaction and a thermal cracking reaction according to an embodiment of the present invention.

Each of FIGS. 5A to 5D shows the change of the composition (number of moles per hour) of a gasification product to temperature depending on a carbon dioxide cracking (reforming) reaction performed by supplying carbon dioxide to a gasification region (dilute oxygen region) and a simple thermal cracking reaction (dilute oxygen condition), and FIG. 6 shows the change of the conversion ratio of carbon to temperature depending thereon (test condition: a coal feed rate of 0.3 kg/hr, a lab-scale tester is used).

As shown in FIGS. 5A to 5D and FIG. 6, in the $CO_2$ cracking reaction route, it can be ascertained that the content of carbon monoxide in the gasification product rapidly increases, whereas the content of carbon dioxide in the gasification product decreases. In contrast, in the thermal cracking reaction route under a dilute oxygen condition, it can be ascertained that the production of carbon monoxide is restricted, and the conversion ratio of carbon in this reaction route is lowered compared to that in the $CO_2$ cracking reaction route.

Figure 7:
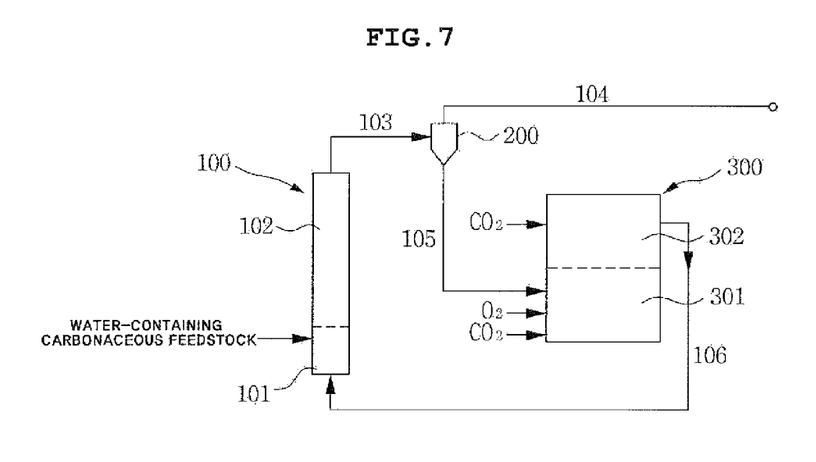
FIG. 7 is a schematic view showing a gasification process according to another embodiment of the present invention, wherein a dryer integrated with a water-gas-shift reaction catalyst layer is disposed at the front of a gasifier, and carbon dioxide is supplied into a dilute oxygen region (reduction region) as well as a combustion region (oxidation region) in a gasifier.

In relation to this, FIG. 7 schematically shows a gasification process according to another embodiment of the present invention, wherein a dryer integrated with a water-gas-shift reaction catalyst layer is disposed in front of a gasifier, and carbon dioxide is supplied into a gasification region 302 (dilute oxygen region) as well as a combustion region 301 (oxidation region) in a gasifier 300.

As described above, when oxygen and carbon dioxide are supplied into the combustion region 301 of the gasifer 300, the degree of the carbon dioxide reforming reaction becomes relatively low, so one or more inlets are provided in the gasification region 302 of the gasifier 300 to supply carbon dioxide into the gasification region 302. In this case, since dilute oxygen conditions are formed, the reaction of carbon with carbon dioxide can be maximized, and thus a carbonaceous feedstock can be replaced by carbon dioxide at the time of preparing carbon monoxide (CO) in the same amount. Particularly, when a transport reactor gasifier is used, carbon dioxide can be additionally supplied to loop-seal, standpipe and/or J-leg.

As described above, the gasification process according to the present invention is advantageous in that a dryer is integrated with a water-gas-shift (WGS) catalyst, and a gasification product (mainly, synthesis gas) is recycled into the dryer, and thus the product can be used as a light source for drying coal, and that a water-gas-shift reaction can be performed using the steam produced during a drying process, and thus hydrogen can be produced without additionally supplying steam.

Further, according to the gasification process of the present invention, when oxygen and/or carbon dioxide, as a gasifying agent, is supplied to a gasifier together with a carbonaceous feedstock, a gasification product (gas phase) containing a large amount of carbon monoxide prepared by reaction route of Reaction Formula 3 above is recycled into a dryer to allow this gasification product to be used as a carbon monoxide source necessary for a water-gas-shift reaction, thereby decreasing the amount of a carbonaceous feedstock required to obtain synthesis gas in the same amount.

Furthermore, the gasification process according to the present invention is advantageous in that the composition ratio of synthesis gas, particularly the ratio of hydrogen/carbon monoxide in synthesis gas to be obtained by controlling a water-gas-shill reaction, can be easily adjusted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A gasification method, comprising the steps of:
   a) supplying a water-containing carbonaceous feedstock into a dryer integrated with a water-gas-shift reaction catalyst;
   b) drying the water-containing carbonaceous feedstock in the dryer to produce a steam while performing a water-gas-shift reaction using the steam as a reactant;
   c) solid-gas-separating the dried carbonaceous feedstock and the water-gas-shift reaction product;
   d) gasifying the dried carbonaceous feedstock in the presence of a gasifying agent to obtain a gasification product; and
   e) recycling at least a part of the gasification product into the dryer in the step b) to provide an energy source for drying the water-containing carbonaceous feedstock.

2. The gasification method of claim 1, wherein the water-containing carbonaceous feedstock has a water content of 20 to 70 wt %.

3. The gasification method of claim 1, wherein the dried carbonaceous feedstock has a water content of 10 wt % or less.

4. The gasification method of claim 1, wherein the water-gas-shift reaction catalyst is applied or supported on a monolithic structure including a plurality of linear or curved inner passageways for passing gas and carbonaceous feedstock particles.

5. The gasification method of claim 4, wherein the carbonaceous feedstock particles has a particle size of 300 to 500 μm, and the size of the inner passageway of the monolithic structure is at least 0.5 cm in a flow direction.

6. The gasification method of claim 4, wherein the water-gas-shift reaction catalyst is configured such that a water-gas-shift reaction catalyst region operated at a high temperature range of 350 to 450° C. and a water-gas-shift reaction catalyst region operated at a low temperature range of 190 to 250° C. are sequentially disposed in a gas flow direction.

7. The gasification method of claim 1, wherein the water-gas-shift reaction catalyst is applied on the inner wall of a water-gas-shift reaction region in the dryer to a thickness of 0.01 to 2 mm.

8. The gasification method of claim 1, wherein the water-gas-shift reaction catalyst is applied on the inner walls of a plurality of tubes disposed in the dryer to a thickness of 0.01 to 2 mm.

9. The gasification method of claim 6, wherein the water-gas-shift reaction catalyst operated at a high temperature range is a $Fe_2O_3/Cr_2O_3$-based catalyst, and the water-gas-shift reaction catalyst operated at a low temperature range is a $CuO/ZnO$-based catalyst.

10. The gasification method of claim 1, wherein the operating pressure in the dryer is a maximum of 60 $kg/cm^2$, the operating temperature at an inlet of the dryer is adjusted in a range of 300 to 1200°C., and the operating temperature at an outlet of the dryer is adjusted in a range of 100 to 500° C.

11. The gasification method of claim 1, the gasifying agent is oxygen, carbon dioxide or a combination thereof.

12. The gasification method of claim 11, the gasifying agent is a combination of oxygen and carbon dioxide.

13. The gasification method of claim 1, wherein the operating temperature in the gasifier is 700 to 1500°C., and the operating pressure in the gasifier is 5 to 60 $kg/cm^2$.

14. The gasification method of claim 11, wherein the gasifying agent is supplied to the gasifier such that the molar ratio of $O_2/C$ is 0.1 to 0.5, and the molar ratio of $CO_2/C$ is 0 to 2.

15. The gasification method of claim 12, wherein the gasifier includes a combustion region and a gasification region, and the gasification region is provided with one or more inlets to supply carbon dioxide.

16. The gasification method of claim 1, further comprising the step of recovering the gaseous water-gas-shift reaction product separated in the step c).

17. A gasification system, comprising:
   a gasifier including a gasifying agent inlet and a dried carbonaceous feedstock inlet;
   a dryer which is integrated with a water-gas-shift reaction catalyst and which discharges a carbonaceous feedstock dried by at least a part of a gasification product recycled from the gasifier and a water-gas-shift reaction product; and
   a solid-gas separator which separates the dried carbonaceous feedstock and water-gas-shift reaction product discharged from the dryer and which is connected with the dried carbonaceous feedstock inlet of the gasifier.

* * * * *